United States Patent
Kim

(10) Patent No.: US 6,398,141 B1
(45) Date of Patent: Jun. 4, 2002

(54) DISCRETING BRAKE DIAL FOR BAITCAST FISHING REEL

(75) Inventor: Hyunkyu Kim, Broken Arrow, OK (US)

(73) Assignee: W. C. Bradley/Zebco Holdings, Inc., Columbus, GA (US)

( * ) Notice: Subject to any disclaimer, the term of this patent is extended or adjusted under 35 U.S.C. 154(b) by 0 days.

(21) Appl. No.: 09/650,591

(22) Filed: Aug. 30, 2000

(51) Int. Cl.⁷ ................................................. A01K 89/02
(52) U.S. Cl. ........................................ 242/289; 242/303
(58) Field of Search ................................ 242/289, 285, 242/243, 301, 302, 306, 307, 303

(56) References Cited

U.S. PATENT DOCUMENTS

| | | | | |
|---|---|---|---|---|
| 4,513,925 A | * | 4/1985 | Yamaguchi | 242/306 |
| 5,108,042 A | | 4/1992 | Puryear et al. | |
| 5,149,009 A | * | 9/1992 | Sato | 242/306 |
| 5,265,824 A | * | 11/1993 | Sato | 242/306 |
| 5,374,002 A | * | 12/1994 | Sato | 242/306 |
| 5,518,194 A | * | 5/1996 | Jeung | 242/306 |
| 5,544,832 A | * | 8/1996 | Okamoto | 242/306 |
| 5,950,949 A | | 9/1999 | Cockerham | |
| 5,984,221 A | | 11/1999 | Kim | |
| 6,003,798 A | | 12/1999 | Kim | |
| 6,065,700 A | | 5/2000 | Kim | |
| 6,206,311 B1 | * | 3/2001 | Kim et al. | 242/288 |

* cited by examiner

Primary Examiner—Emmanuel M. Marcelo
(74) Attorney, Agent, or Firm—Fellers, Snider, Blankenship, Bailey & Tippens, P.C.

(57) ABSTRACT

A braking apparatus for a fishing reel having at least two predetermined breaking positions comprising: a side cover having an aperture; a brake dial rotatably receivable in the aperture, the dial having a detent spring retained in a cavity therein; and a spool cover having one or more cam lobes wherein when the brake dial is positioned within the aperture, the spring lobe will interact with the cam lobe or lobes such that rotation of said brake dial will be inhibited in at least one direction until sufficient rotational force is applied to the brake dial to cause deformation of the detent spring sufficient to allow the spring lobe to traverse the interfering cam lobe.

15 Claims, 7 Drawing Sheets

DISCRETING BRAKE DIAL FOR BAITCAST FISHING REEL

BACKGROUND OF THE INVENTION

1. Field of the Invention

This invention relates generally to braking systems for fishing reels. More particularly, but not by way of limitation, the present invention relates to adjustable braking systems for baitcast fishing reels.

2. Background

Baitcast fishing reels are well known in the art. A baitcasting reel will typically comprise: a split frame having a pair of opposing side plates; a foot extending from the frame for attaching the reel to a fishing rod; a line spool, rotatably positioned between the frame side plates, for retrieving and holding a fishing line; a spool shaft, on which the spool is secured, having ends extending through the frame side plates; a pinion gear (typically a helical gear) provided on the spool shaft; a manually rotatable crank handle; a gear train and crankshaft assembly mechanically linking the crank handle to the spool shaft pinion gear; a level-wind mechanism which transverses the spool during winding to ensure that the fishing line is properly wound along the length of the spool; a clutch mechanism for preventing reverse rotation of the crank handle; an exterior actuator (typically a thumb lever) for disengaging the pinion gear from the spool shaft to allow the spool to rotate freely during casting; and a spool drag or spool braking mechanism.

In most cases, right and left side covers are removably attached to the frame side plates for housing the reel's various operating mechanisms. A right-handed baitcasting reel (i.e., a reel designed for a right-handed user) will typically be structured such that: the spool drag or spool braking mechanism is housed under the left side cover; the crank handle is rotatably mounted outside of the right side cover; and the crankshaft, gear train, pinion gear, clutch, and anti-reverse mechanism are housed under the right side cover. As will be understood by those skilled in the art, a left-handed version of generally any baitcasting reel can be produced by simply reversing the arrangement and structure of the reel's components such that the left-handed reel is a mirror image of the right-handed version of the reel.

Spool drag or spool braking systems are commonly used in baitcasting reels to alleviate line backlashing (also referred to as "line nesting") problems. Because they utilize transversely-oriented spools which rotate during casting, baitcasting reels are more prone to backlashing problems than are spinning reels and spin casting reels. Such problems result primarily from the rotational momentum carried by the spool during casting. The most common types of drag/braking mechanisms used in baitcasting reels are magnetic drag brakes and centrifugal (friction) braking systems.

Many environmental factors, as well as personal preferences, affect the amount of braking force which may be appropriate for a given cast. This has led to the development of adjustable braking systems for baitcasting reels. For example, U.S. Pat. No. 5,108,042 discloses an adjustable, magnetic drag mechanism which exerts a magnetic drag force on the end of the spool. The magnetic force slows rotation of the spool during casting. The U.S. Pat. No. 5,108,042 mechanism comprises: a magnet carrier ring having a plurality of magnets attached thereto; an axially movable cam disc to which the magnet carrier ring is secured; and an adjustment dial projecting through a recess in the left cover. The dial includes cams which are operably associated with the cam disc for selectively moving the carrier ring toward and away from the end of the spool in order to adjust the amount of magnetic drag force applied to the spool.

U.S. Pat. No. 6,003,798 discloses a centrifugal braking system wherein the braking force exerted by the system can be selectively adjusted. Like the magnetic system of U.S. Pat. No. 5,108,042, the centrifugal braking system of U.S. Pat. No. 6,003,798 employs an externally adjustable brake dial having a plurality of cam ramps provided thereon to convert rotary movement of the brake dial into axial movement. In the centrifugal system, the axial movement of a brake ring selectively adjusts the number of braking pieces which can contact the brake ring. Unlike the magnetic system of U.S. Pat. No. 5,108,042, the brake dial of U.S. Pat. No. 6,003,798, in conjunction with the side cover of the reel, provides a discreting feature to place, and temporarily hold, the inventive breaking apparatus in specific, preselected positions.

A discreting feature may be desirable for a number of reasons, e.g. to allow a fisherman to readily return to a given braking force, to ensure proper alignment of centrifugal braking elements with the brake ring, etc. Unfortunately, the space within the side cover for the discreting feature is not always available in a given reel design, particularly with contemporary, tear-drop shaped baitcast fishing reels. Therefore, there exists a need for a brake dial which provides discrete positioning of the adjusting mechanism while locating the structural elements of the discreting feature away from the interface between the reel side cover and the brake dial.

It is thus an object of the present invention to provide an adjustable braking system for a baitcast fishing reel which includes a discreting adjustment mechanism to provide an appropriate number of discrete braking positions to accommodate the majority of operating environments wherein the discreting mechanism is not located about the perimeter of the dial.

It is a further object of the present invention to provide smooth, fluid movement over a range of braking positions.

SUMMARY OF THE INVENTION

The present invention provides a fishing reel braking apparatus which satisfies the needs and alleviates the problems discussed above. The inventive apparatus preferably comprises: a side cover; a brake dial rotatably positioned in the side cover such that the brake dial is externally accessible and operable from outside of the side cover, the brake dial having a plurality of predetermined positions; at least one cam lobe provided on either the brake dial or the spool cover; and a elastomeric spring integrally formed in the other of the brake dial or the spool cover for interaction with the cam lobe such that, when the elastomeric spring contacts a cam lobe, the elastomeric spring must be momentarily deformed to traverse the cam lobe thus providing a discrete "detent" position in the adjustment mechanism. The inventive brake dial also includes a feature to limit the rotation of the dial to a desired range.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENT

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

While the preferred embodiment of the inventive discreting brake dial is hereinafter shown and described as incorporated in a contemporary baitcast fishing reel with a centrifugal brake, the invention is not so limited. It will be apparent to those skilled in the art that the inventive brake dial is equally well suited for use in any type of baitcast fishing reel, for example a traditional round baitcast fishing reel, and is suitable for use with either centrifugal or magnetic braking systems.

Figure 1:
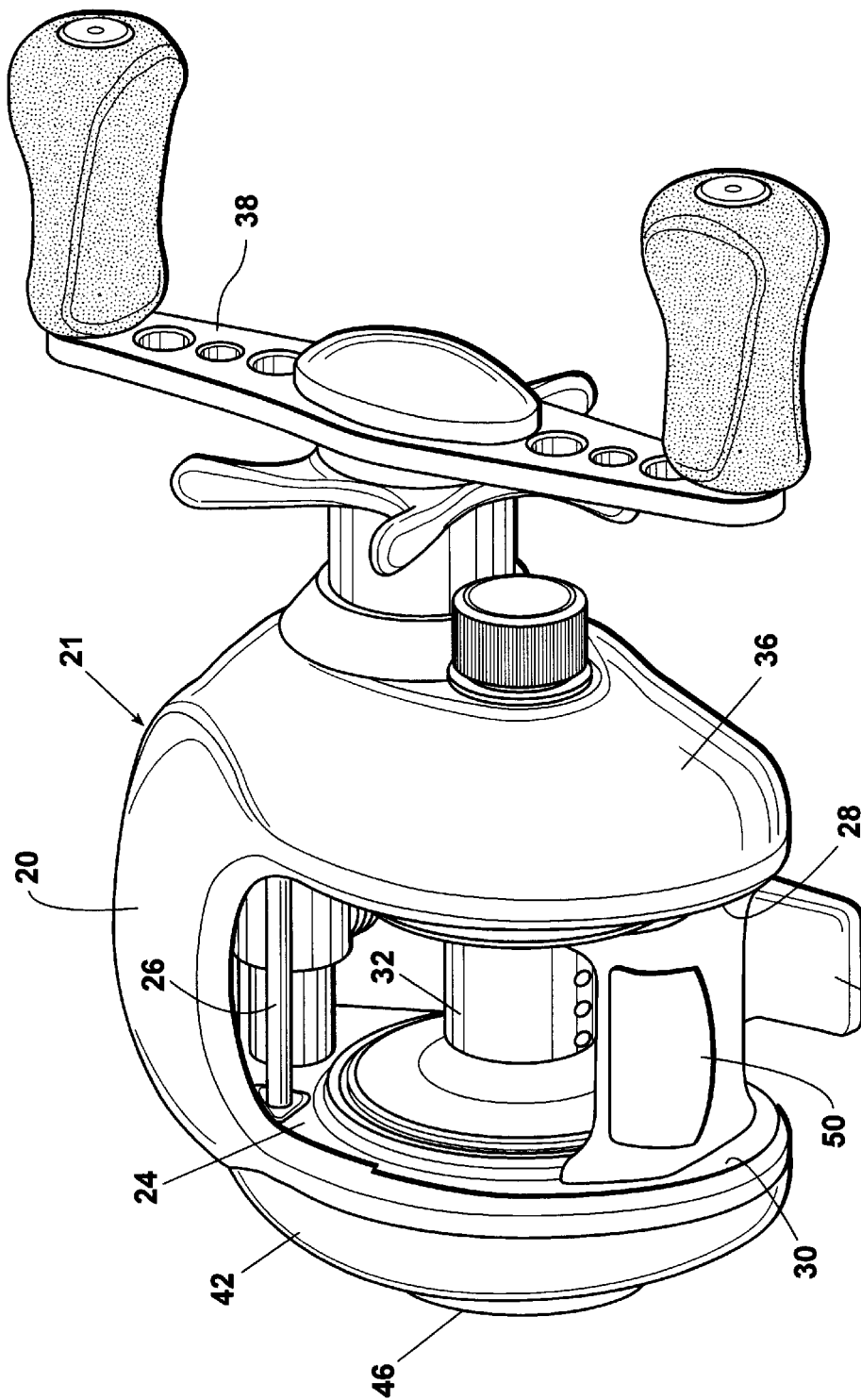
FIG. 1 provides a perspective view of a baitcast fishing reel having an inventive discreting brake assembly incorporated therein.
Figure 2:
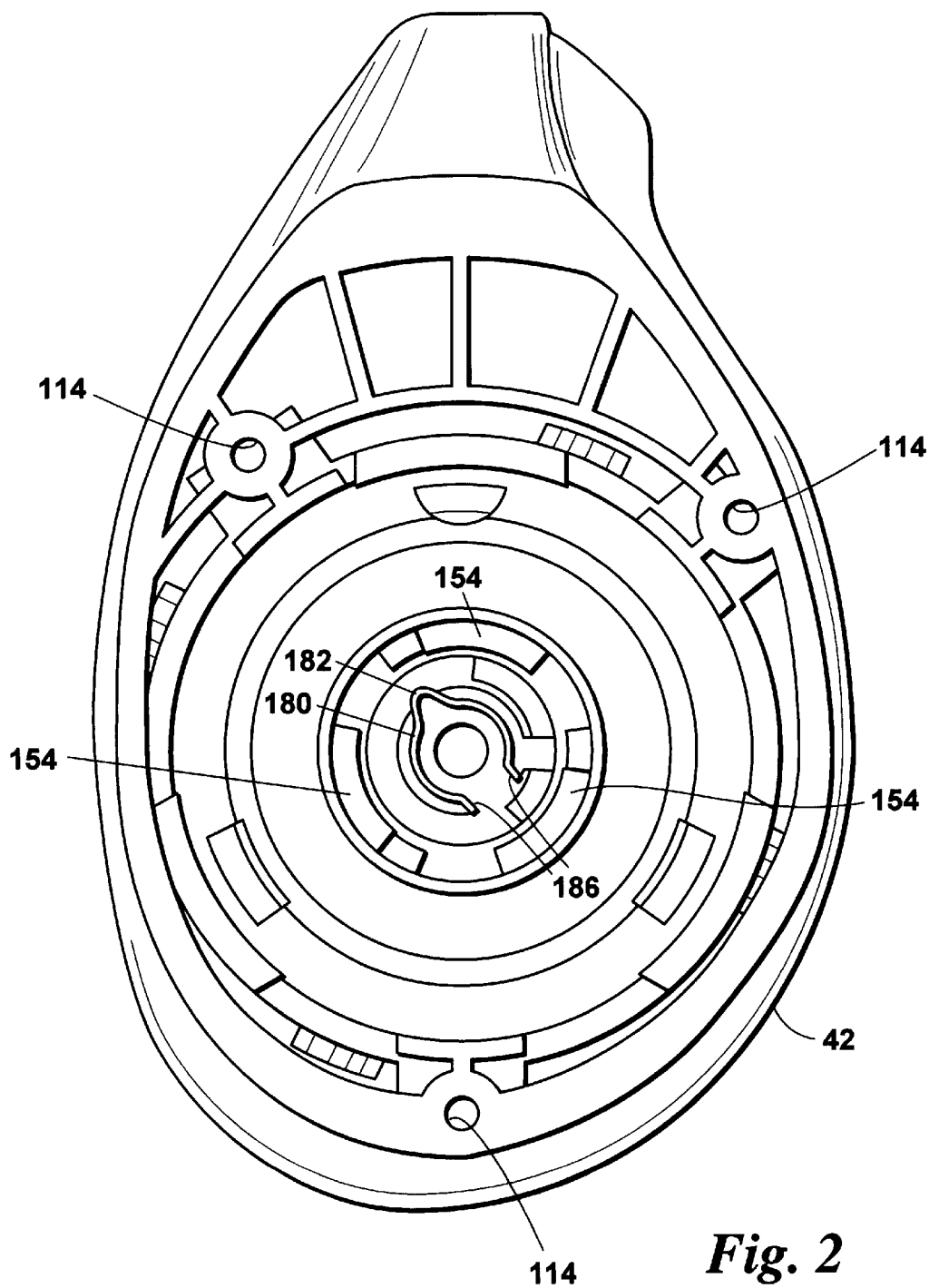
FIG. 2 provides a view of the inside of the left cover for a baitcast fishing reel with an inventive brake dial inserted therein.

Referring now to the drawings, wherein like reference numerals indicate the same parts throughout the several views, a contemporary baitcasting reel 24, wherein is incorporated a preferred embodiment of the inventive, discreting brake dial assembly 22 (FIG. 4) is shown in FIG. 1. Baitcasting reel 24 comprises: a frame 26 having a right side plate 28 and a left side plate 30; a line spool 32 rotatably mounted in frame 26 between side plates 28 and 30; a spool shaft 34 (FIG. 4) extending through spool 32; right side cover 36 secured over side plate 28; hood 20 and front cover 21 secured to frame 26; a crank handle 38, operably extending from right cover 36, for rotating spool 32; a reel foot 40, provided on the bottom of frame 26, for attaching reel 24 to a fishing rod; a left side cover 42 secured over left side plate 30; and a thumb actuator 50 for temporarily disengaging spool 32 from crank handle 38 during casting. When reel 24 is assembled, the brake dial 46 of inventive discreting brake dial assembly 22 projects through a circular aperture 48 (FIG. 6) formed in left cover 42.

Although for convenience, the inventive apparatus is shown herein and described as incorporated in a right-handed baitcasting reel, the inventive apparatus is equally adaptable for use in left-handed reels. As will be understood by those skilled in the art, a left-handed version of generally any baitcasting reel can be produced by simply reversing the arrangement and structure of the reel's components such that the left-handed reel is a mirror image of the right-handed version of the reel.

Figure 4:
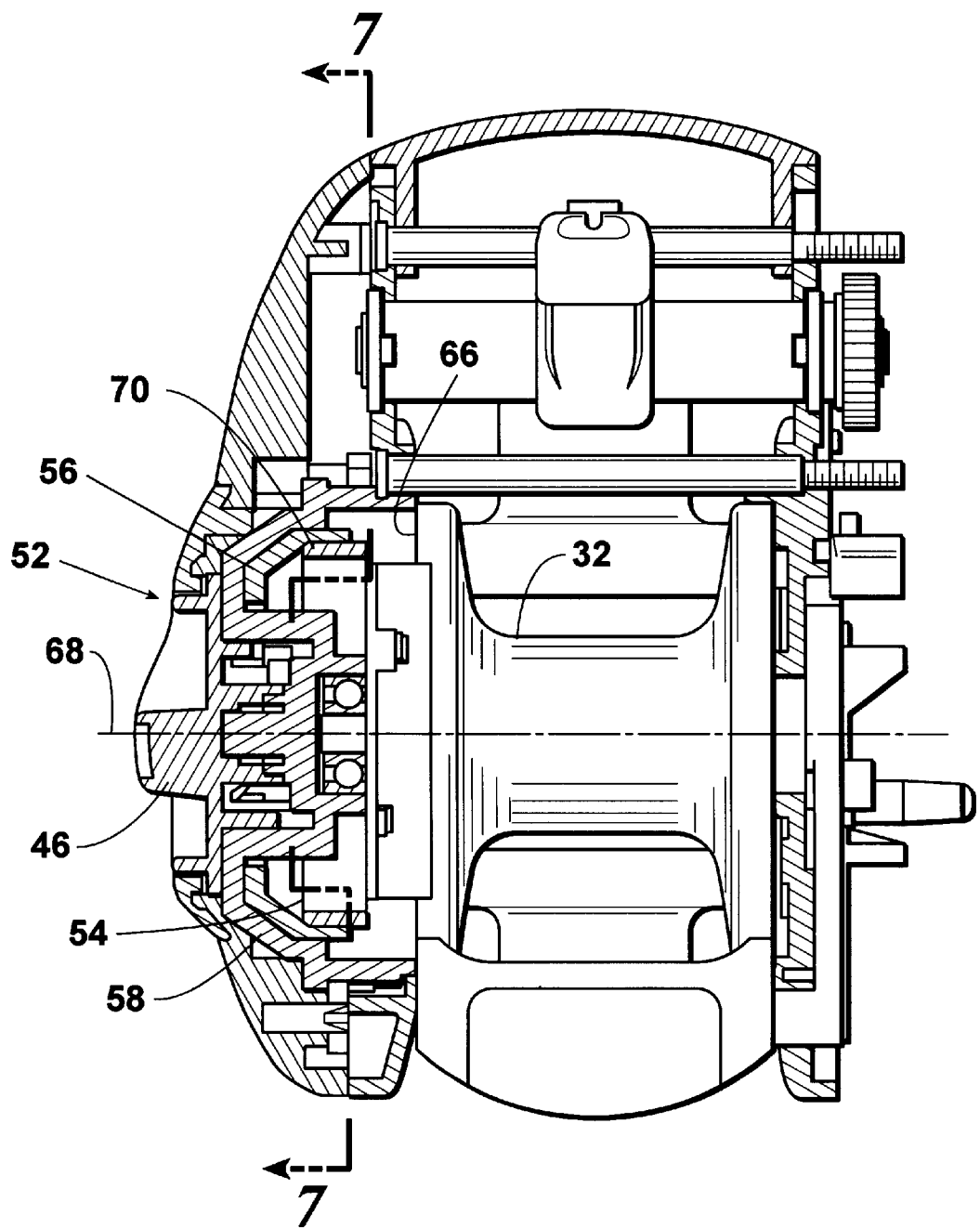
FIG. 4 provides a cutaway top view of a baitcast fishing reel having an inventive discreting brake assembly incorporated therein.

As best seen in FIG. 4, braking system 52 preferably comprises: inventive brake dial 46, braking element assembly 54, brake ring assembly 56, and spool cover 58.

Preferably, brake element assembly 52 is of the type described in U.S. Pat. No. 6,003,798 which is hereby incorporated herein by reference. Brake element assembly 52 includes brake element housing (not shown) having a plurality of T-shaped radial slots for slidably retaining corresponding T-shaped brake elements. The slots are preferably evenly spaced around the housing at varying axial positions which, as explained hereinbelow, desirably allows a wide range of specific brake settings.

As used herein, the terms "left" and "left facing" describe features facing and/or positioned away from end 66 of line spool 32. The terms "right" and "right facing", on the other hand, describe features facing and/or positioned toward end 66.

Brake element assembly 54 is secured to spool 32 such that assembly 54 rotates with spool 32 and the rotational axis 68 of brake element assembly 54 is collinear with the rotational axis of spool 32. When brake element assembly 54 rotates with spool 32, the resulting centrifugal force urges the T-shaped elements to slide radially outward in the corresponding T-shaped slots away from axis 68. Brake elements are sized such that, at least when the elements slide into their outermost radial positions, they project from their corresponding slots.

Figure 5:
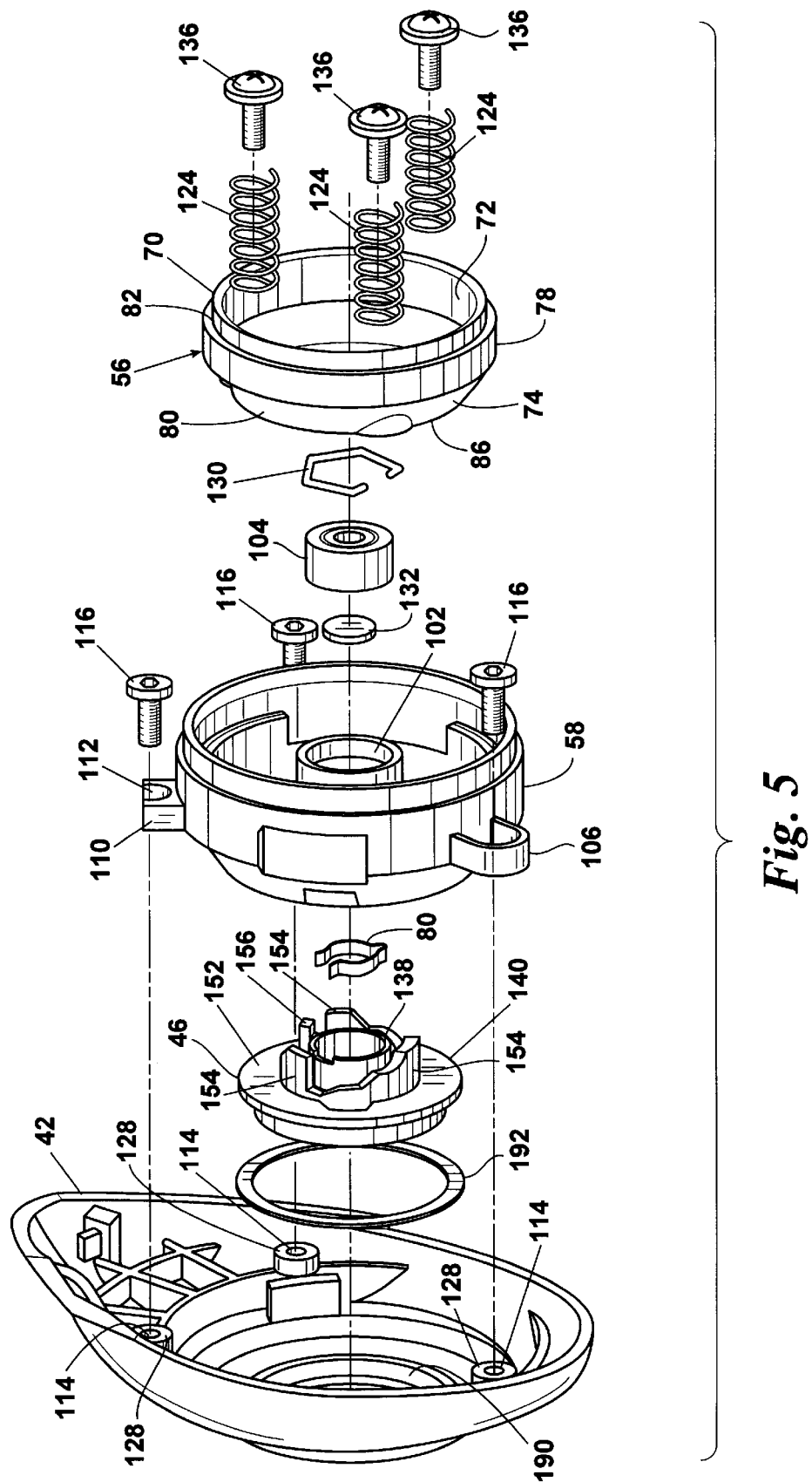
FIG. 5 provides an exploded view from the right side of the inventive discreting brake assembly.
Figure 6:
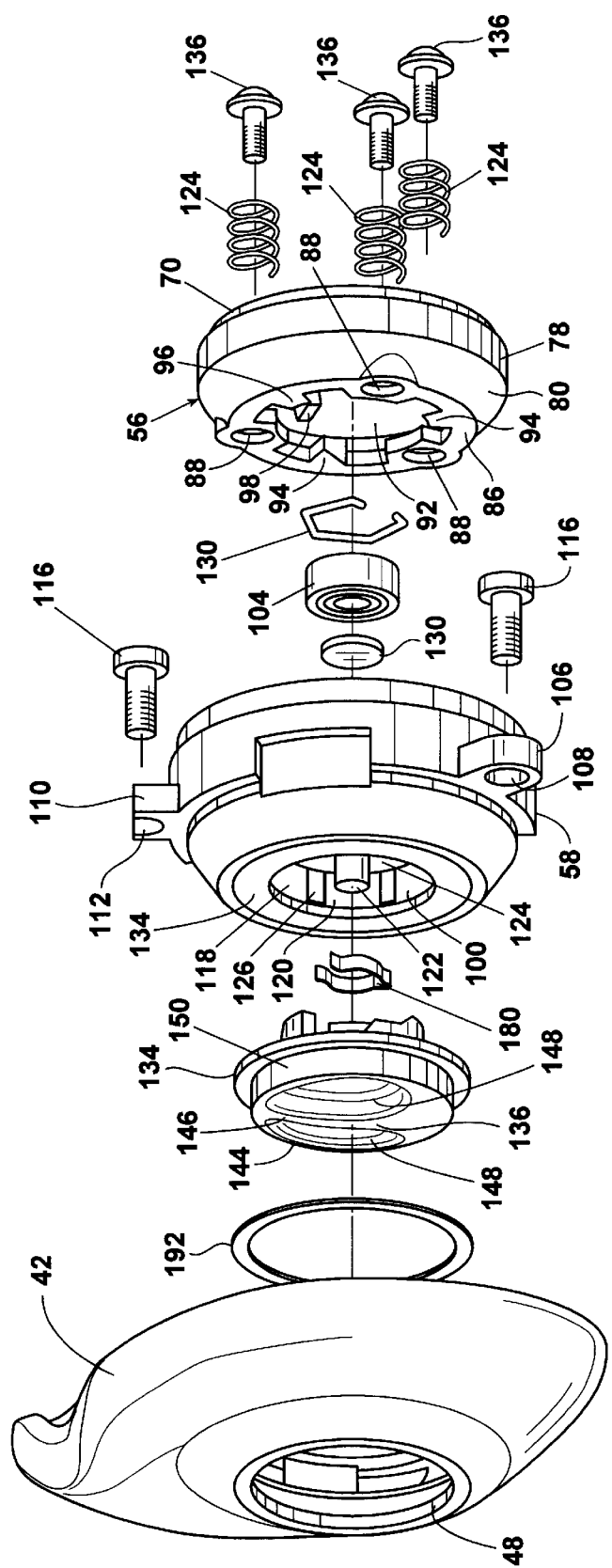
FIG. 6 provides an exploded view from the left side of the inventive discreting brake assembly.

As best seen in FIGS. 5 and 6, brake ring assembly 56 comprises: brake ring 70 having an interior cylindrical braking surface 72; and a collar 74 for holding and carrying brake ring 70. As will be understood by those skilled in the art, brake ring assembly 56 could be replaced with a unitary structure wherein, for example, a cylindrical braking surface is integrally formed in collar 74.

Collar 74 comprises: a substantially cylindrical right portion 78; an inwardly tapered left longitudinal end portion 80; a cylindrical bore 82, formed in the right portion 78, wherein brake ring 70 is press fit or otherwise retained; a flat inwardly extending, left end wall 86; a plurality of (preferably three) cylindrical bores 88 extending through, and evenly spaced around, end wall 86; a large central aperture 92 extending through end wall 86; and a plurality of (preferably three) interacting structures 94.

Interacting structures 94 project radially into, and are evenly spaced about, central aperture 92. Each interacting structure 94 preferably comprises a lateral arm 96 which extends radially into central aperture 92 from left end wall 86 and a left facing rounded boss 98 projecting from the distal end portion of lateral arm 96.

As is commonly the case with baitcasting reels, reel 24 includes an interior spool cover 58 comprising: a cylindrical interior cavity 102 for holding a spool shaft bearing or bushing 104; a plurality of (preferably two) radially projecting ears 106; apertures 108 provided through radial ears 106; and a radially projecting, partial ear structure 110 having a semicircular notch 112 formed in the outer end thereof. Apertures 108 and notch 112 are sized and positioned to receive internally-threaded bosses 114, provided in the interior of side cover 42, such that spool cover 58 can be secured to side cover 42 by means of bolts or screws 116. Bearing 104 is retained in cavity 102 by spring clip 130 against thrust plate 132.

Figure 7:
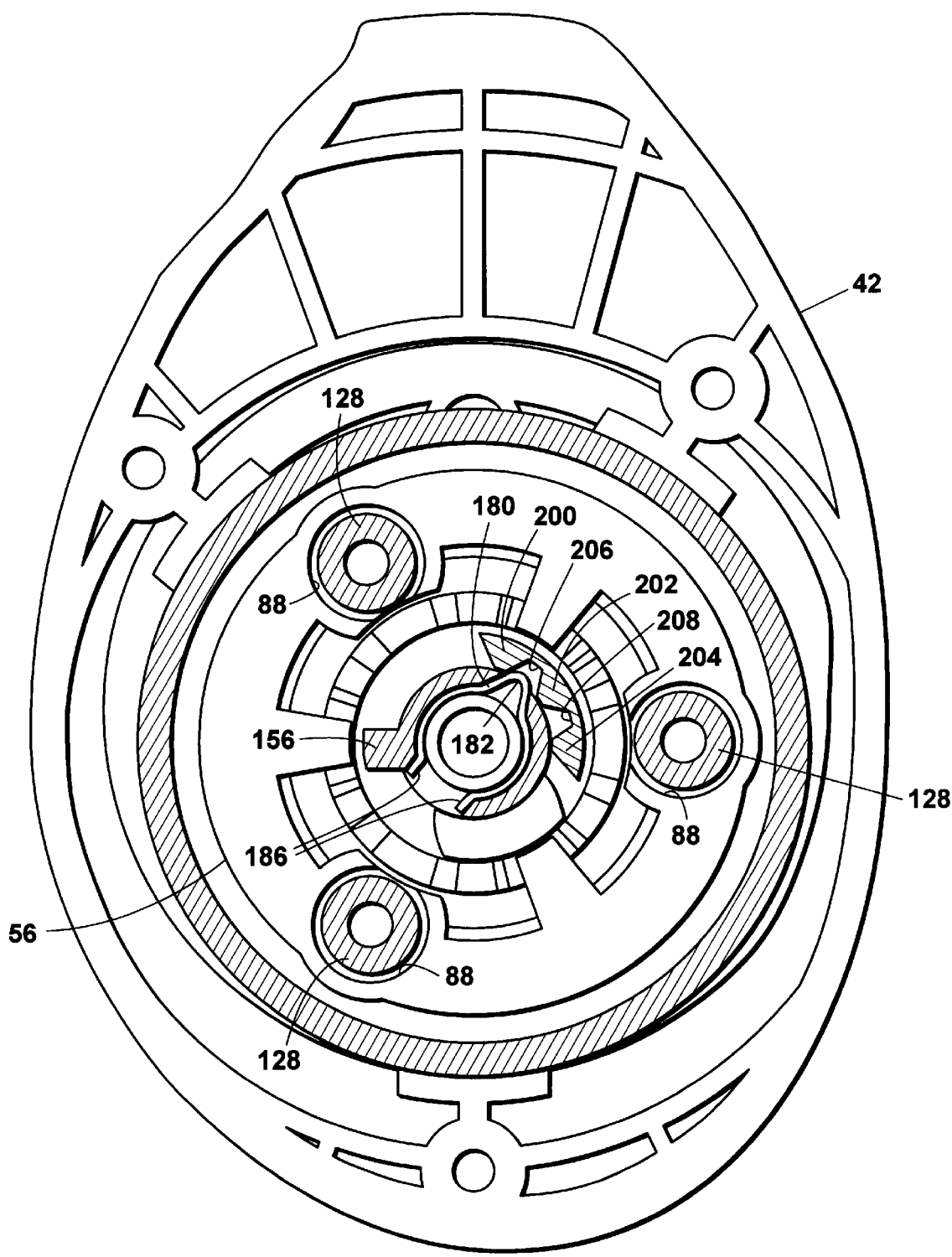
FIG. 7 provides a cutaway view of a left side cover having the inventive discreting brake assembly attached thereto.

In the inventive apparatus, spool cover 58 preferably includes: a cylindrical cavity 100 provided in the left face 134 of spool cover 58; a substantially cylindrical interior wall 118 provided in cylindrical cavity 100; a radial wall 120 provided at the interior end of cylindrical cavity 100; a cylindrical guide post 122 projecting along the axis of cylindrical cavity 100; and a plurality of slots 126 provided through interior end wall 120 and extending longitudinally into the cylindrical wall 118 of cavity 100. The number of longitudinal slots 126 provided in spool cover 58 corresponds to the number of intersecting structures 94 provided at the left end of brake collar 74. Longitudinal slots 126 are sized and spaced such that interacting structures 94 are received in slots 126 for reciprocating left and right movement with respect to spool cover 58. As best seen in FIG. 7, cylindrical wall 118 has cam lobes 200, 202, and 204 formed thereon inherently creating valleys 206 and 208 therebetween. As will be discussed further hereinbelow, cam lobes 200, 202, and 204, and valleys 206 and 208 interact with the inventive brake dial 46 to establish discrete braking positions.

Continuing now with FIG. 7, spool cover 58 also includes a plurality of right facing internally threaded bosses 128 which are sized and spaced for receipt through the forward bores 88 of brake collar 74 such that collar 74 can slide longitudinally along bosses 128. With bosses 128 received through bores 88, springs 124 are positioned around bosses 128 and are held in place by means of bolts or screws 136. Springs 124 exert a continuous, biasing force against the forward end wall 86 of brake collar 74 and thus continuously act to urge collar 74 to the left within spool cover 58.

Various features of brake dial 46 are depicted in FIGS. 2, 3, 5, 6, and 7. Referring first to FIG. 6, brake dial 46 preferably comprises a circular dial plate 140 and, projecting from the left face of dial 46, a grasping structure 142. Grasping structure 142 includes cylindrical external wall 144, a left facing ridge 146 extending laterally across the center of grasping structure 142, and a pair of finger cavities 148 formed in the left face of grasping structure 142 and separated by ridge 146. The transition from the cylindrical exterior wall 144 of grasping structure 142 to circular dial plate 140 forms a radial shoulder 150 which extends around brake dial 46.

Referring next to FIG. 5, projecting from the right face 152 of brake dial 46 are a plurality of cams 154 (preferably three), stop 156, and cylindrical post 138.

Figure 3:
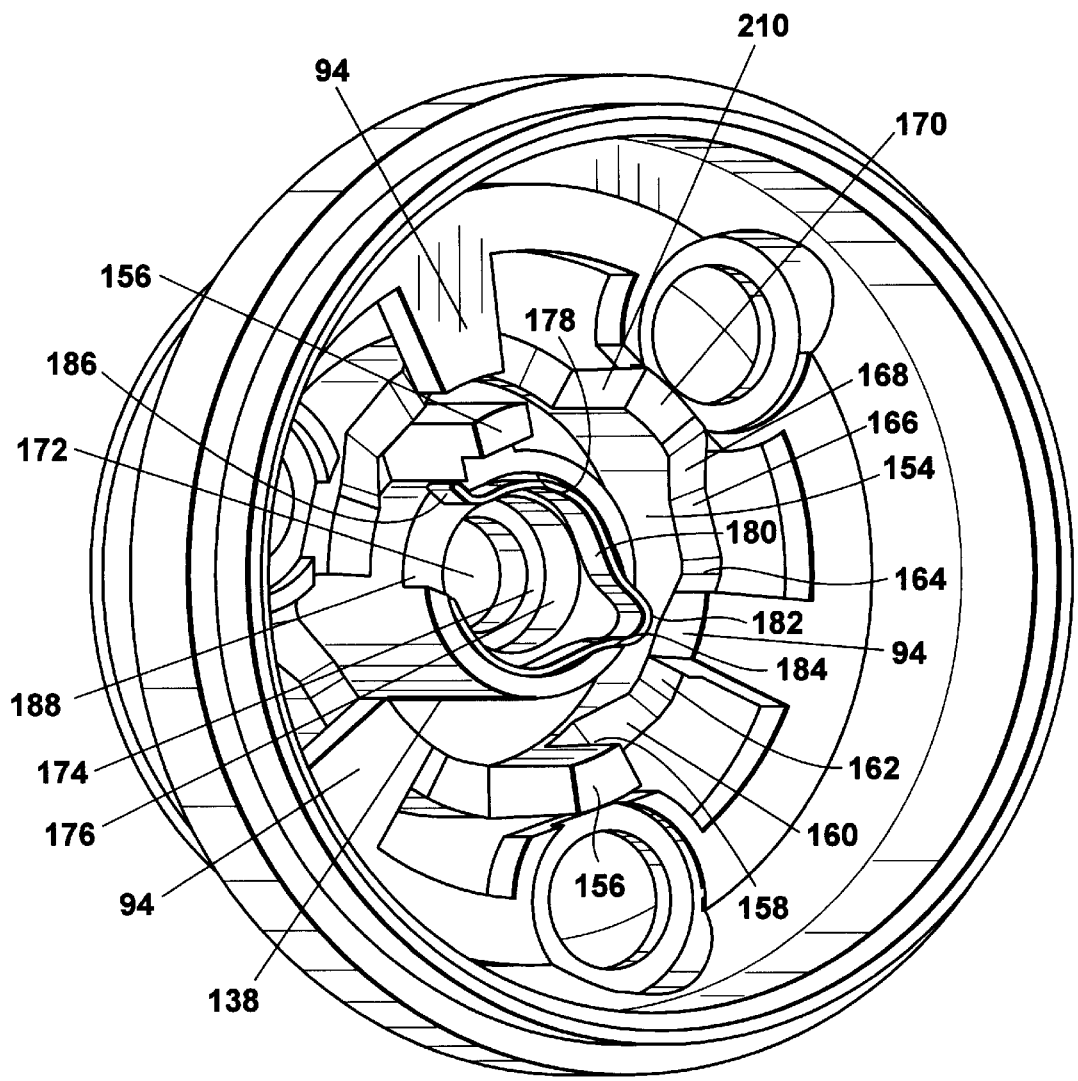
FIG. 3 provides a perspective view of a brake ring assembly the interacting structures of which are in contact with the cam ramps of an inventive brake dial.

Referring now to FIG. 3, cams 154 are arranged in a circular pattern around cylindrical post 138 and are receivable in the left, cylindrical cavity 100 of spool cover 58 (FIG. 6) for rotational movement adjacent to cylindrical interior wall 118. Cams 154 interact with interacting structures 94 to thereby selectively move brake ring assembly 56 through a series of braking positions. For such interacting, each cam 140, as best seen in FIG. 3, preferably comprises: a first flat 158 provided at the base/leading end of the cam; a first sloped segment 160; a second flat 162; a second sloped segment 164; a third flat 166; a third sloped segment 168; and a fourth flat 170. Each of sloped ramp segments 160, 164, and 168 most preferably has a substantially constant slope.

Cylindrical post 138 includes a first cylindrical cavity 172 sized to receive guidepost 122 of spool cover 58 (FIG. 6). At radial wall 174, first cavity 172 transitions to second cavity 176 having interior wall 178. Detent spring 180 is received in second cavity 176 with lobe 182 projecting through notch 184 in wall 178 and ends 186 of spring 180 nesting in notch 188 in wall 178.

Referring once again to FIGS. 5 and 6, when reel 24 is assembled, brake dial 46 is rotatably held between (a) an internal radial shoulder 190 formed in side cover 42 around circular aperture 48 and (b) the left face 134 of spool cover 58. A thin friction reducing ring 192, washer, or other such element is preferably positioned between the radial shoulder 150 of brake dial 46 and the interior radial shoulder 190 of side cover 42. The right face 152 of dial plate 140 slidably abuts the left face 134 of spool cover 58.

Referring to FIG. 7, detent spring 180 is non-rotatably received in cavity 176 such that rotational movement of dial 46 will result in a corresponding movement of spring 180. Spring 180 interacts with cam lobes 200, 202, and 204, and with valleys 206 and 208 to provide discrete breaking positions. For example, when brake dial 46 is positioned such that spring lobe 182 lies in valley 206 movement of the dial will be inhibited until sufficient force is applied to the dial to deform spring 180 sufficiently to traverse either cam lobe 200 or cam lobe 204. Likewise, if dial 46 is positioned with spring lobe 182 lying in valley 208 movement of dial 46 will be inhibited until sufficiently rotational force is applied to dial 46 to cause spring 180 to deform spring 180 sufficiently to traverse either cam lobe 202 or cam lobe 204. If the user attempts to place dial 46 in position where spring lobe 182 lies other than in valley 206, valley 208, immediately clockwise of cam lobe 200, or immediately counterclockwise of cam lobe 204, spring lobe 182 will interact with the appropriate cam to urge spring lobe 182, and thus dial 46, into the nearest discrete position.

Rotation of dial 46 is limited in the counterclockwise direction by the contact of stop 156 against cam lobe 200 and in the clockwise director by contact between each interacting structure 94 and vertical rise 210 of the adjacent cam 154.

When the inventive apparatus is assembled, springs 124 urge collar 74 to the left such that the interacting structures 94 of collar 74 are maintained in operable contact with dial cams 154. When the rounded bosses 96 of interacting structures 94 are positioned on first cam flats 158, brake ring assembly 56 is preferably held in a fully forward, non-braking position wherein none of the brake elements can contact brake ring 70. As the user turns brake dial 46 counterclockwise, the first sloped segments 160 of cams 70 act against interacting structures 96 to push interacting structures 96 and brake ring assembly 56 rearward. As the interacting structures traverse the first sloped segments 160 of dial cams 154, detent spring 180 simultaneously traverses the first cam lobe 200, When interacting structures 96 mate with second flats 162 of the dial cams 154, detent spring 180 will be positioned in valley 206, thereby retaining dial 46 and brake ring assembly 70 in an initial braking position. As the user continues to rotate dial 46 counterclockwise, the second sloped segments 164 of cams 154 push interacting structures 94 further rearward such that rounded bosses 96 will next be positioned on cam flats 166 with detent spring 180 positioned in valley 208, thereby retaining dial 46 and brake ring assembly 56 in an intermediate braking position. Finally, as the user continues to rotate dial 46 counterclockwise, the third sloped segments 168 of cams 154 push interacting structures 96 further rearward such that rounded bosses 96 will next be positioned on cam flats 170 with detent spring 180 positioned immediately counterclockwise of to cam lobe 204, thereby retaining dial 46 and brake ring assembly 56 in a full braking position.

Thus it can be seen that, in the preferred embodiment, the discreting brake dial will produce a discrete position for each possible braking position. The user may not inadvertently place the dial in a position where a brake element will rub against the edge of the brake ring.

If, in operating dial 24, the user does not squarely position brake dial 46 in a detent position, i.e. where lobe 182 of detent spring 180 is positioned either in a valley 206 or 208, immediately clockwise of cam lobe 200 or immediately counterclockwise of cam lobe 204, spring lobe 182 will act against the curved outer edge of the cam lobe 200, 202, or 204 to rotate dial 46 until detent spring lobe 182 then lies in the nearest detent position.

While the above discussion pertains to the preferred embodiment wherein a centrifugal brake is employed, it will be apparent to those skilled in the art that the inventive device likewise has application in bait cast fishing reels with magnetic brakes.

As will be understood by those skilled in the art, although the preferred embodiment of the inventive apparatus utilizes three cams and three corresponding interacting structures, the inventive apparatus could optionally utilize one, two, three, or more cams. Further, although the cams of the preferred embodiment provide flat areas corresponding to the discrete braking positions provided by the interaction between the detent spring and the cams, cams of constant slope or cams of varying slope could also be used. Moreover, although the preferred embodiment provides four specific brake settings, generally any number of settings could be used. The inventive apparatus will preferably provide at least two braking positions.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A braking apparatus for a fishing reel having at least two discrete positions comprising:
   a side cover having an aperture therein;
   a brake dial having a cavity therein, said brake dial receivable in said aperture for rotation;
   a detent spring having a spring lobe thereon, said detent spring receivable in said cavity;
   a spool cover having at least one cam lobe thereon, wherein when said brake dial is positioned within said aperture, said spring lobe will interact with said at least one cam lobe such that rotation of said brake dial will be inhibited in at least one direction until sufficient rotational force is applied to said brake dial to cause deformation of said detent spring sufficient to allow said spring lobe to traverse said at least one cam lobe; and,
   an adjustable centrifugal braking assembly wherein said brake dial is operable for adjustment of said centrifugal braking assembly.

2. The braking apparatus of claim 1 wherein said centrifugal braking assembly includes:
   a movable brake ring in operable communication with said brake dial.

3. The braking apparatus of claim 1 wherein said brake dial also includes at least one cam ramp having a plurality of flats thereon corresponding to said predetermined positions of said brake dial.

4. The braking apparatus of claim 1 wherein said spool cover includes three cam lobes for interaction with said spring lobe, thereby providing four predetermined braking positions.

5. A braking apparatus for a fishing reel having a plurality of predetermined braking positions comprising:
   a side cover;
   a brake dial rotatably positioned in said side cover such that said brake dial is externally accessible and operable from outside of said side cover, said brake dial having a cavity therein;
   a detent spring receivable in said cavity said detent spring having a spring lobe thereon;
   a spool cover having a plurality of cam lobes thereon, wherein said spring lobe will interact with said plurality of cam lobes to establish a plurality of discrete positions of said brake dial corresponding to the predetermined braking positions; and
   a centrifugal braking assembly including a movable brake ring in operable communication with said brake dial.

6. The braking apparatus of claim 5 wherein said brake dial includes at least one cam ramp having a plurality of flats thereon corresponding to said predetermined positions of said brake dial.

7. The braking apparatus of claim 6 further comprising at least one interacting structure for contact with said at least one cam ramp, said at least one interacting structure being non rotatably secured relative to said brake dial such that rotation of said brake dial will result in linear movement of said at least one interacting structure.

8. A braking apparatus for a fishing reel having at least two discrete positions comprising:
   a side cover having an aperture therein;
   a brake dial having a cavity therein, said brake dial receivable in said aperture for rotation;
   a detent spring having a spring lobe thereon, said detent spring receivable in said cavity;
   a spool cover having at least one cam lobe thereon, wherein when said brake dial is positioned within said aperture, said spring lobe will interact with said at least one cam lobe such that rotation of said brake dial will be inhibited in at least one direction until sufficient rotational force is applied to said brake dial to cause deformation of said detent spring sufficient to allow said spring lobe to traverse said at least one cam lobe; and
   wherein said brake dial also includes at least one cam ramp having a plurality of flats thereon corresponding to predetermined positions of said brake dial.

9. The braking apparatus of claim 8 further comprising an adjustable centrifugal braking assembly wherein said brake dial is operable for adjustment of said centrifugal braking assembly.

10. The braking apparatus of claim 9 wherein said centrifugal braking assembly includes:
    a movable brake ring in operable communication with said brake dial.

11. The braking apparatus of claim 8 wherein said spool includes three cam lobes for interaction with said spring lobe, thereby providing four predetermined braking positions.

12. The braking apparatus of claim 8 further comprising at least one interacting structure for contact with said at least one cam ramp, said at least one interacting structure being non rotatably secured relative to said brake dial such that rotation of said brake dial will result in linear movement of said at least one interacting structure.

13. A braking apparatus for a fishing reel having a plurality of predetermined braking positions comprising:
    a side cover;
    a brake dial rotatably positioned in said side cover such that said brake dial is externally accessible and operable from outside of said side cover, said brake dial having a cavity therein;

a detent spring receivable in said cavity said detent spring having a spring lobe thereon; and, a spool cover having a plurality of cam lobes thereon, wherein said spring lobe will interact with said plurality of cam lobes to establish a plurality of discrete positions of said brake dial corresponding to the predetermined braking positions; and wherein said brake dial includes at least one cam ramp having a plurality of flats thereon corresponding to said predetermined positions of said brake dial.

14. The braking apparatus of claim 13 further comprising a centrifugal braking assembly including:

a movable brake ring in operable communication with said brake dial.

15. The braking apparatus of claim 13 further comprising at least one interacting structure for contact with said at least one cam ramp, said at least one interacting structure being non rotatably secured relative to said brake dial such that rotation of said brake dial will result in linear movement of said at least one interacting structure.

* * * * *